United States Patent
Denisart et al.

(10) Patent No.: US 7,854,192 B2
(45) Date of Patent: Dec. 21, 2010

(54) DEVICE AND METHOD FOR PREPARING A DRINK FROM A FOOD SUBSTANCE CONTAINED IN A CAPSULE

(75) Inventors: Jean-Paul Denisart, La Conversion (CH); Patrick Caprotti, Forel/Lavauxn (CH); Jean-Luc Denisart, Cully (CH); Alex Kollep, Lutry (CH)

(73) Assignee: Nestec S.A., Vevey (CH)

( * ) Notice: Subject to any disclaimer, the term of this patent is extended or adjusted under 35 U.S.C. 154(b) by 876 days.

(21) Appl. No.: 10/569,515

(22) PCT Filed: Aug. 13, 2004

(86) PCT No.: PCT/EP2004/009126

§ 371 (c)(1),
(2), (4) Date: Feb. 19, 2007

(87) PCT Pub. No.: WO2005/020770

PCT Pub. Date: Mar. 10, 2005

(65) Prior Publication Data

US 2007/0185434 A1     Aug. 9, 2007

(30) Foreign Application Priority Data

Aug. 25, 2003 (EP) .................................. 03019162

(51) Int. Cl.
*A47J 31/40* (2006.01)
*A47J 31/06* (2006.01)

(52) U.S. Cl. ...................................... 99/295; 99/302 R
(58) Field of Classification Search .................... 99/295, 99/302 R See application file for complete search history.

(56) References Cited

U.S. PATENT DOCUMENTS

| 2,589,783 | A | | 3/1952 | Crossley et al. | |
|---|---|---|---|---|---|
| 5,398,596 | A | * | 3/1995 | Fond | 99/295 |
| 5,472,719 | A | * | 12/1995 | Favre | 426/77 |
| 6,740,345 | B2 | * | 5/2004 | Cai | 426/77 |
| 6,955,116 | B2 | * | 10/2005 | Hale | 99/295 |
| 6,997,103 | B2 | * | 2/2006 | Shaw et al. | 99/295 |

FOREIGN PATENT DOCUMENTS

| DE | 74 30 109 | 3/1976 |
|---|---|---|
| EP | 0 242 556 B1 | 3/1990 |
| EP | 1 295 554 A1 | 3/2003 |

* cited by examiner

*Primary Examiner*—Reginald L Alexander
(74) *Attorney, Agent, or Firm*—K & L Gates LLP

(57) ABSTRACT

The invention relates to a method of wetting and/or dissolving a substance contained in a capsule for producing a beverage consisting, by means of a piercing and injection element, in piercing the capsule and injecting a liquid under pressure into the capsule to wet and/or dissolve the substance; the piercing and injection element being arranged so as to inject the liquid into the capsule in the form of at least one thin layer extending in a continuous, divergent and multidirectional manner, covering a spray surface in an arc of a circle inside the capsule. The invention also relates to a device comprising a flow channel and a valve designed to close off the channel in a first position, called the rest position, and to open under the effect of the pressure from the liquid against an elastic element so as to free a passage as a function of the pressure and thus create the thin layer of liquid.

6 Claims, 5 Drawing Sheets

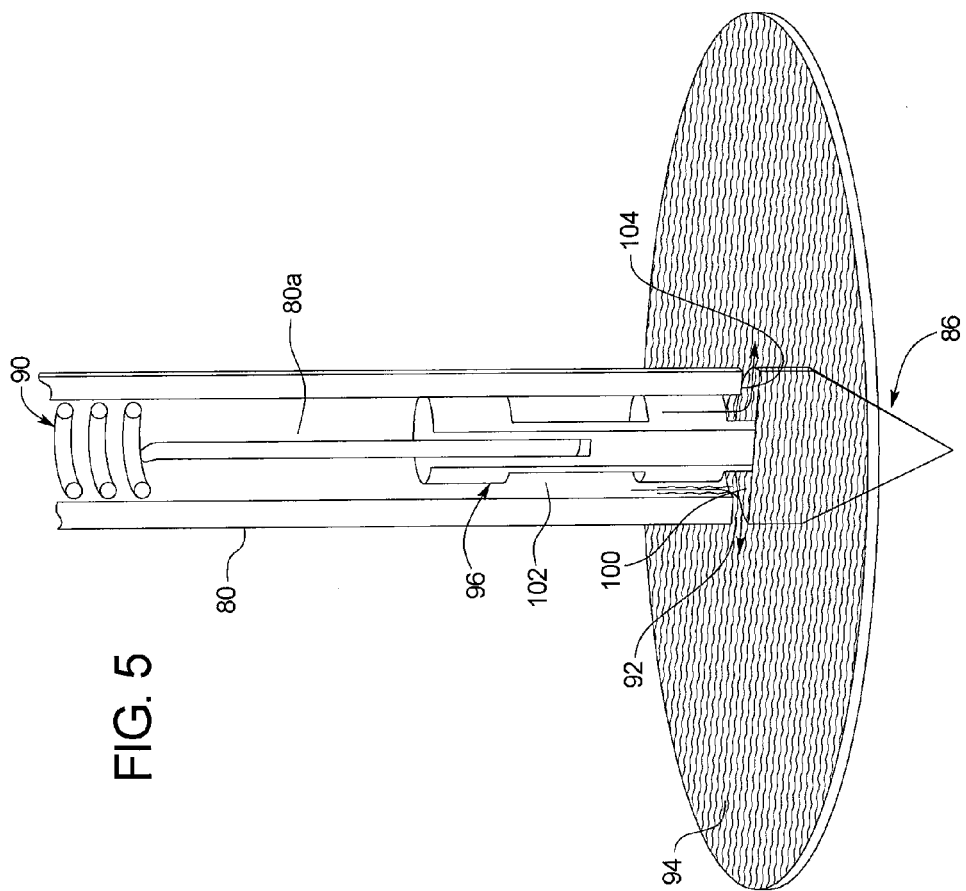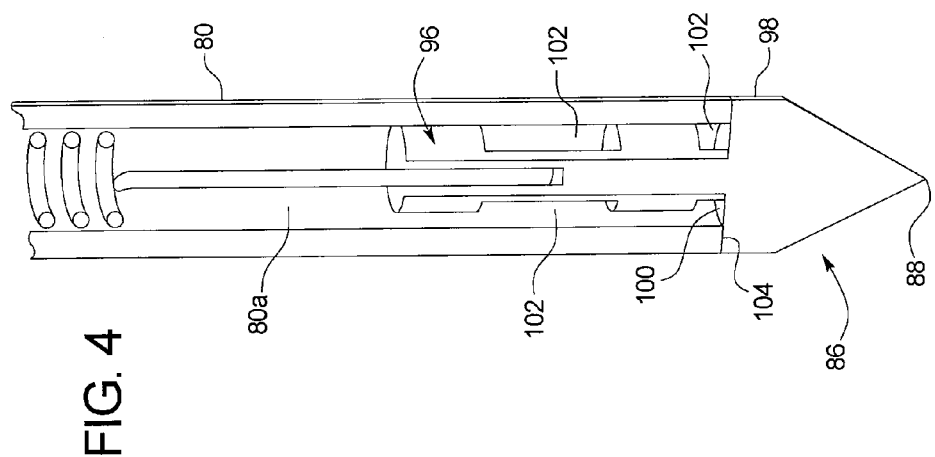

FIG. 6A
FIG. 6B
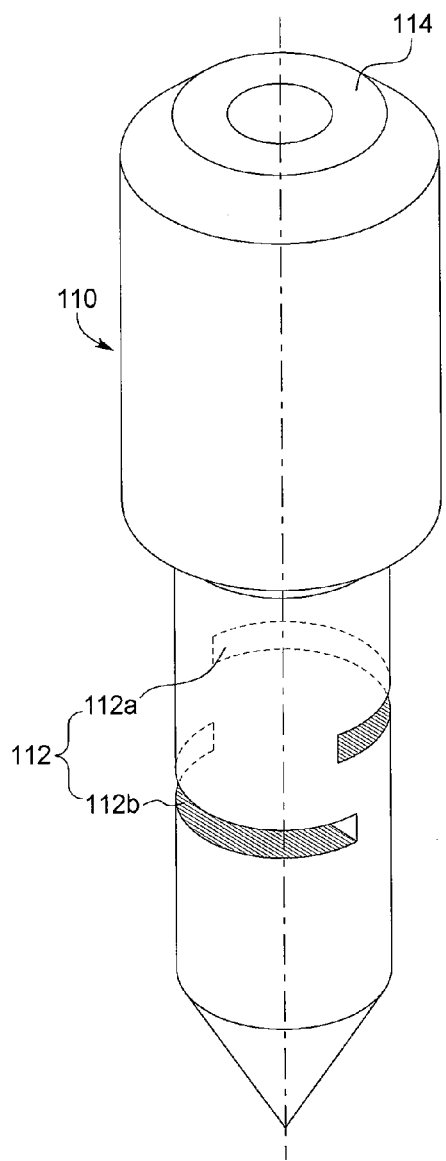
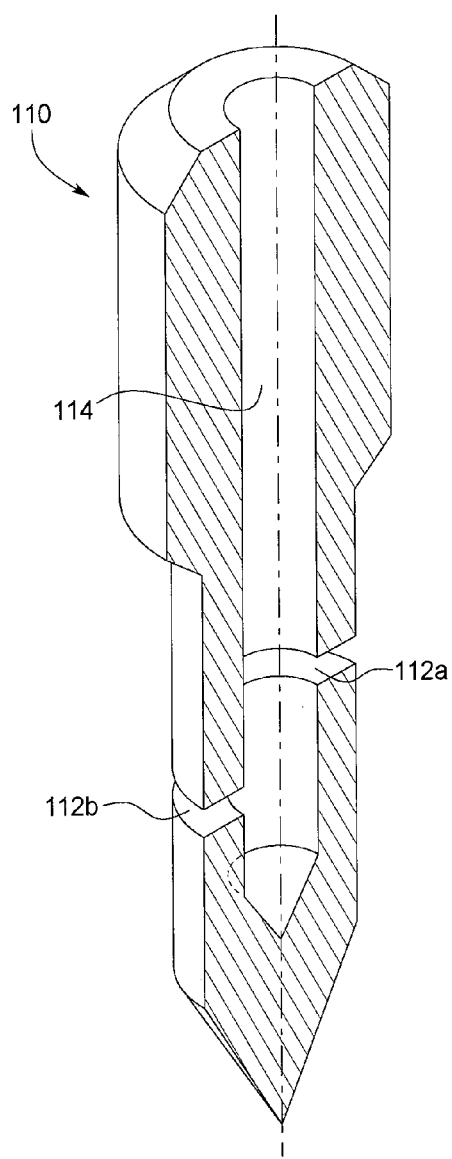

DEVICE AND METHOD FOR PREPARING A DRINK FROM A FOOD SUBSTANCE CONTAINED IN A CAPSULE

BACKGROUND

The present invention relates to a device for preparing a beverage from a food substance, such as a substance to be extracted and/or dissolved, contained in a capsule. More particularly, the invention relates to such a device comprising an improved piercing and injection element. The invention also relates to a method for improving the wetting or dissolution of a substance contained in a capsule.

The use of predetermined, prepackaged servings in capsule form containing a substance to be extracted, such as ground coffee, or a substance to be dissolved, such as chocolate products for preparing beverages, has many advantages, including facilitating the operations of preparing the beverage, ensuring relatively clean preparation, and controlling a relatively constant amount and quality of the beverage prepared.

The principle of extraction or dissolution of substances contained in the closed capsule typically consists in enclosing the capsule in a closed chamber of a preparation device, piercing one face of the capsule, injecting a quantity of hot water under pressure into the capsule so as to create a pressurized environment inside the capsule in order to extract the substance or dissolve it, then discharging the substance extract or dissolved substance through an opposite face of the capsule which, in contact with projecting parts of the device, opens under the effect of the internal pressure.

Devices for implementing this principle have already been described, for example in patents CH 605 293 and EP 242 556. According to these documents, the device comprises a housing for the capsule and a piercing and injection element in the form of a hollow pointed part comprising, in its distal region, one or more liquid injection orifices. The pointed part has a dual function in that it opens the upper part of the capsule, on the one hand, and constitutes the channel for water to enter the capsule, on the other hand. To improve the extraction and/or dissolution of the substance contained in the capsule, it has also been envisaged to equip these devices with several pointed parts each performing the abovementioned dual function, as described in document EP 1 203 554.

A first drawback of such devices lies in the fact that, because they are so small, the liquid injection orifices in the pointed part tend to become quickly blocked due to the scale in the water or contact with the substance, particularly when the capsule is not removed from the apparatus immediately and the piercing element is not rinsed after use, which affects the performance of the device. In particular, the flow becomes less regular and the jet becomes slower over time. This affects the conditions of extraction, the dissolution of the substance and, for example, the production of foam.

It would therefore be convenient to have a device that solves these problems.

Secondly, in the devices of the prior art, the method of wetting is based on the production of one or more discrete jets directed in a preferential direction. A single, discrete directed jet is often not enough to wet or dissolve a mass of substance contained in a capsule. Furthermore, a single jet creates a preferential path and forms holes in the mass of substance without however wetting or dissolving it completely. It is therefore usual to use several jets each directed in different directions. However, such a wetting or dissolution method is not entirely satisfactory because preferential paths are still created.

There is therefore a need for a method that wets or dissolves the substance more satisfactorily, without creating preferential paths but while maintaining the speed of the jet necessary to properly wet or dissolve the substance and, as appropriate, cause it to foam.

SUMMARY

The main aim of the invention is therefore to overcome the drawbacks of the abovementioned prior art by providing a device for preparing a beverage from a food substance, such as a substance to be extracted and/or dissolved, contained in a capsule, that makes it possible in particular to prevent the risk of reduction of flow owing to obstruction of the injection orifice(s) of the piercing and injection element formed by scale build-up or substance residues.

For this purpose, the invention relates to a device for preparing a beverage from a food substance, such as a substance to be extracted and/or dissolved, contained in a capsule, the said device comprising a housing for receiving the capsule, at least one piercing and injection element having a channel for receiving a liquid under pressure, the said piercing and injection element being designed to project into the said housing and pierce a face of the capsule in at least one position of operation of the device so as to allow a liquid to be introduced into the said capsule from the said channel, the device being characterized in that the piercing and injection element has a distal end arranged in the form of a valve having a closure means with an end, the said valve being designed to close off the said channel in a first position, called the rest position, and to open under the effect of the pressure from the liquid against an elastic element so as to free a passage as a function of the pressure and thus create a layer of liquid sprayed through the said passage in a second position, called the work position.

Such a configuration of the piercing and injection element has the advantage of being self-cleaning since, in the absence of pressure from the liquid, the passage through which the liquid flows is closed and only opens after the liquid has been pressurized in the channel. Because the passage is closed off by the closure means in the absence of pressure, any problem of obstruction by scale or substance residues is avoided, even if the capsule has not been removed from the apparatus immediately after use.

According to a preferred embodiment of the invention, the piercing and injection element is placed substantially at the centre of the capsule housing and is designed to produce a multidirectional divergent spray in the form of at least one layer of liquid. The thin layer advantageously extends continuously around the periphery of the pointed part so as to spray the substance contained in the capsule in a substantially circular manner. This special configuration thus makes it possible to distribute, simply, a consistent layer of water over a sector of 360 degrees.

Preferably, the end of the piercing and injection element is pointed so as to pierce or tear the face of the capsule and thus allow water to enter the capsule.

Preferably, the piercing and injection element comprises a tubular body defining the channel. This tubular body comprises a proximal orifice for connection to a liquid intake and a distal orifice defining the said passage with the said pointed part. The distal orifice and the proximal orifice are linked by the said channel, and the said closure means has a rear guide part that slides in the said tubular body while the pointed end comprises an external peripheral surface lying in the extension of the external peripheral surface of the said tubular body.

By virtue of this structure, the closure means may bear against the tubular body of the piercing and injection element at the time of piercing so that it does not interfere with the piercing of the film. Furthermore, there is no risk that the closure means will catch on the film when the element is being disengaged from the capsule.

The invention also aims to propose a novel method of wetting and/or dissolving a substance contained in a capsule for producing a beverage consisting, by means of a piercing and injection element, in piercing the capsule and injecting a liquid under pressure into the capsule to wet and/or dissolve the substance. The element is arranged so as to inject the liquid into the capsule in the form of at least one thin layer extending in a continuous, divergent and multidirectional manner, covering a spray surface in an arc of a circle inside the capsule. Thus, such a spray configuration has the advantage of dispersing the liquid over a large surface while retaining the advantages of power and speed of a jet but avoiding the drawbacks of discrete directed jets that create holes or preferential paths through the substance. When such holes or preferential paths are created, some of the substance is not extracted or dissolved, resulting in a loss of solid material and flavour of the beverage and therefore a poorer quality beverage.

Preferably, the thin layer covers a spray surface of between 30 and 360 degrees, preferably between 120 and 360 degrees, inside the capsule. The liquid may be injected from the central axis of the capsule; in this case it is preferable to have a multidirectional circular layer or expanse extending over 360 degrees.

The injection may also be shifted with respect to the central axis; in this case it is preferable to have at least two spray layers, each spraying in an arc of 45 to 180 degrees, preferably 120 to 180 degrees. The spray layer is preferably directed transversely to the direction in which the beverage emerges from the capsule, so as to spray the widest surface possible and thus allow the injected liquid to then flow through the mass. Thus, it is ensured that the entire mass is wetted and fewer preferential paths are created. In general, the direction in which the beverage emerges corresponds to the axis of the capsule and therefore to the vertical, or to a direction close to the vertical. The direction of the layer or expanse could also be slightly inclined with respect to this transverse direction, downwards or upwards, in particular by up to 30 degrees approximately.

Preferably, the thin layer has a thickness of less than or equal to 0.5 mm, preferably less than 0.3 mm. Such thicknesses guarantee that the liquid emerges in the form of a jet with enough kinetic energy to dissolve the soluble substances and overcome the loss of pressure that occurs as the liquid passes through the substances to be extracted to reach the edges of the capsule.

The thin layer is obtained by means of at least one slot in the piercing or injection element. This slot may be fixed or, on the contrary, opened only at the time of injection in response to the pressure from the fluid. The advantage of the slot opening under the effect of the pressure from the fluid is that it is self-cleaning, guaranteeing reproducible wetting and/or dissolution of the substance cycle after cycle. However, a fixed expanse is a more simple and less expensive design.

Other characteristics and advantages of the invention will appear on reading the description of an exemplary embodiment, given by way of non-limiting illustration, with reference to the attached drawings, in which:

Additional features and advantages are described herein, and will be apparent from the following Detailed Description and the figures.

BRIEF DESCRIPTION OF THE FIGURES

FIGS. 4 and 5 are perspective views, in partial section, of a detail of the piercing element in the rest position and the work position, respectively;

FIGS. 6a and 6b are diagrammatic views, in perspective and in sectional perspective respectively, of a variant embodiment of the piercing and injection element that can be used in the device of the invention.

DETAILED DESCRIPTION

Figure 1:
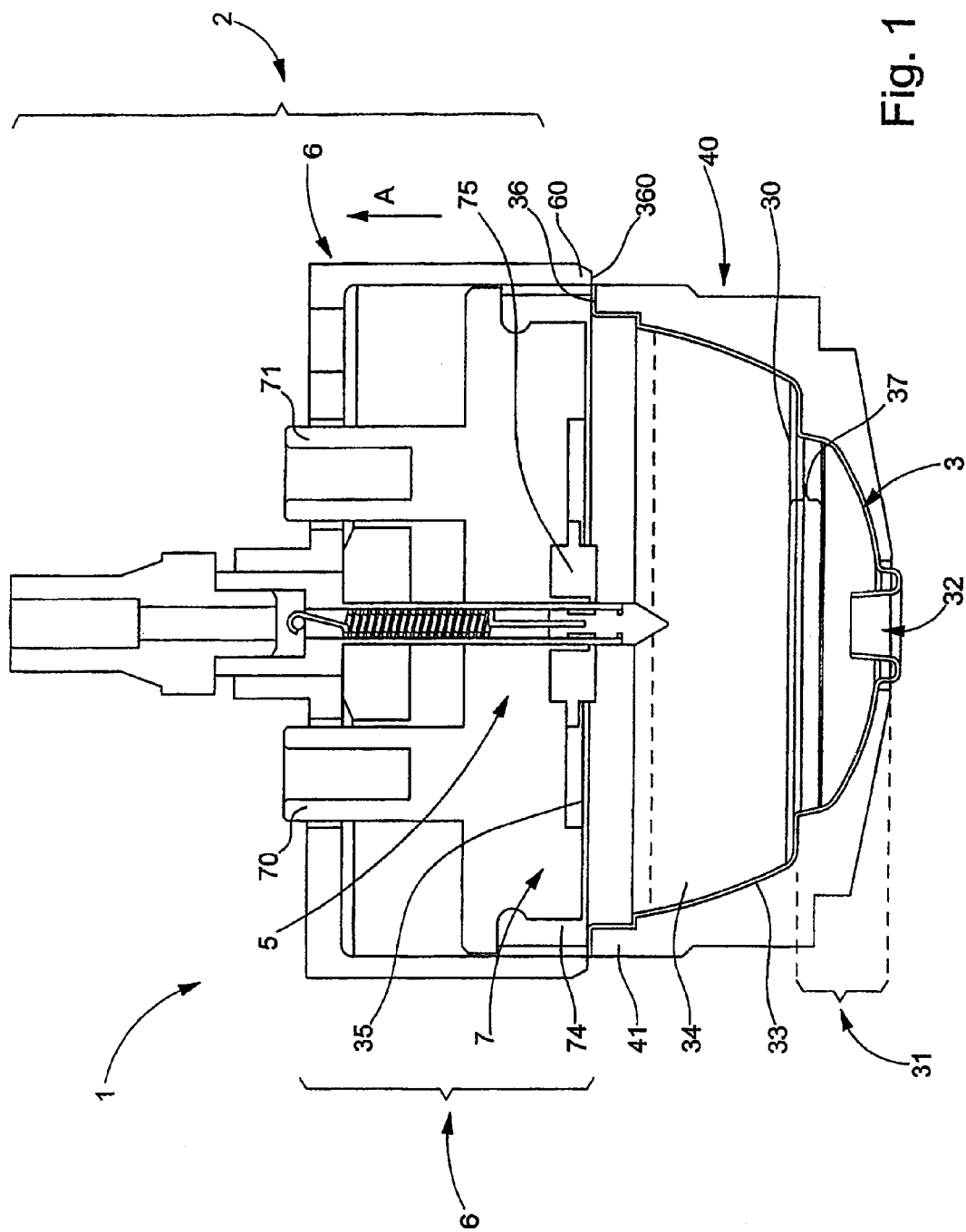
FIGS. 1 and 2 are sectional views of a device for preparing a beverage according to a preferred embodiment, the device being shown in two different operating modes.
Figure 2:
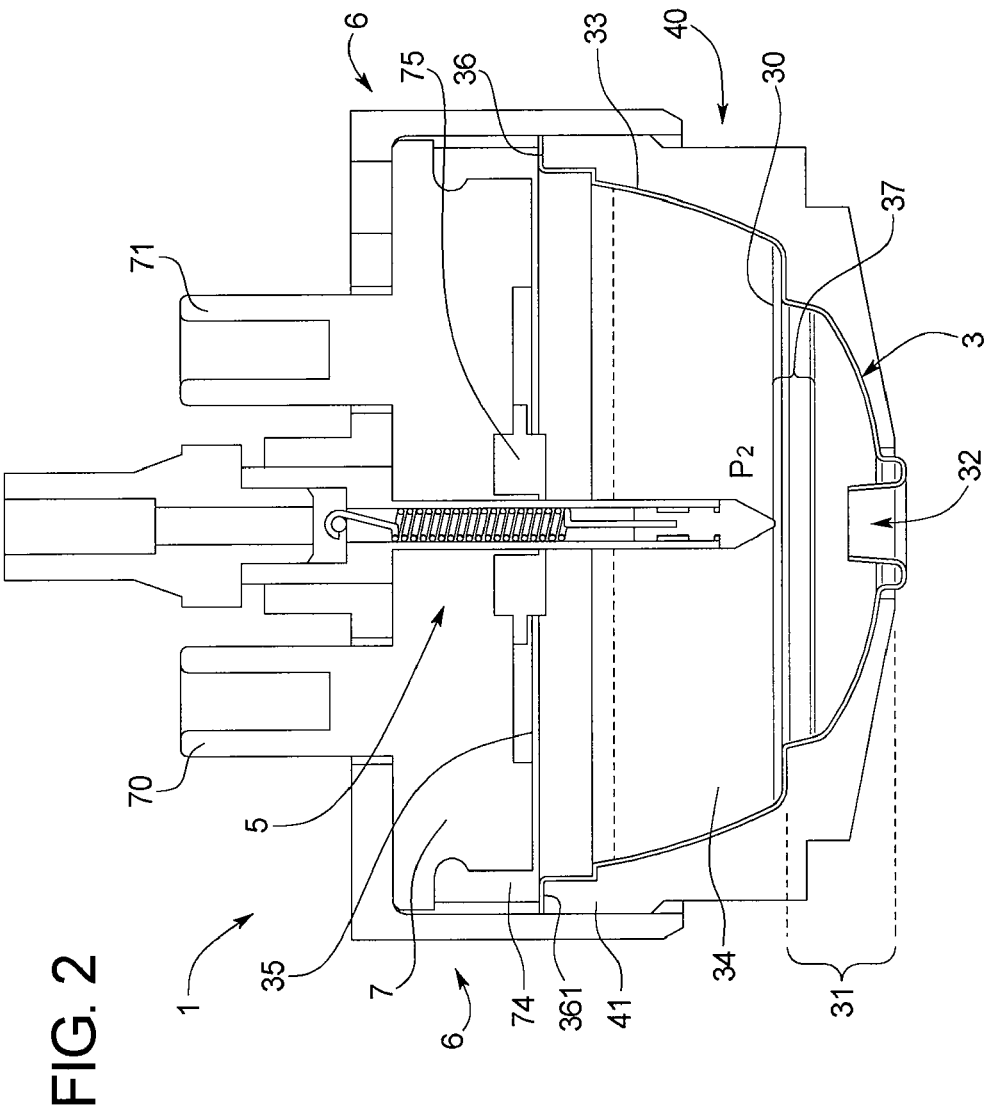

With reference to FIGS. 1 and 2, an embodiment of a preparation device 1 is illustrated in cross section, this device comprising a system 2 for piercing and injecting a fluid under pressure, preferably hot or cold water, which in the example shown can be switched between at least two positions of different depths of injection inside a capsule 3. The device comprises a first lower subassembly in the form of a capsule support 40 whose shape and size are adapted to receive at least part of the capsule 3. The capsule 3 may be a closed, open or partially open capsule.

According to a preferred embodiment, the capsule comprises a closed chamber containing the substance to be extracted and/or dissolved and a retaining portion such as a membrane 30 that opens, under the effect of the rise in pressure inside the chamber, in contact with engagement means such as relief elements 37. The engagement means may either form part of the capsule itself or form part of the capsule support 40. The capsule may also preferably comprise means 31 for collecting the liquid extracted or the mixture and a duct means 32 that are specific to it, which has the advantage, in combination with the integrated opening means, of delivering a product without direct contact with the device, in particular with the capsule support 40, ensuring protection from cross contamination of the beverages, better hygiene, less cleaning and greater simplicity in the actual design of the preparation device. More precisely, the capsule may comprise a dish 33, made of plastic or another material, for forming or housing the functional elements, namely the relief elements, the sealed opening membrane 30 and the duct means 32. The dish 33 may be closed to form the chamber 34 by means of a second inlet membrane 35 sealed to sealing edges 36 of the capsule. Naturally, the configuration of the capsule may be of other designs and/or shapes without however departing from the scope of the invention. The capsule could, for example, comprise a body formed for the most part from a flexible material (sachet) that is inserted into the device in an equivalent manner.

A preferred capsule is described in more detail in Euro-PCT patent application No. 03/00384 filed on 13 Jan. 2003, whose entire content is incorporated herein by way of reference.

The device 1 comprises a second subassembly or piercing and injection system 2 that cooperates in closure with the capsule support 40 to define a housing for receiving the capsule 3. The piercing and injection system 2 comprises a central piercing and injection element 5 having a channel for receiving a liquid under pressure, the piercing and injection element 5 being designed to project into the said housing and pierce the capsule 3 in at least one position of operation of the device 1 so as to allow a liquid to be introduced into the capsule 3 through the channel. The piercing and injection system 2 is associated with an actuating means 6 that is integral with the element 5 so as to move it, in the example illustrated, into various wetting positions inside the capsule. For this purpose, the piercing and injection element 5 passes through a core 7 that is moved in closure relative to the capsule support 40. It is understood that the head base can move relative to a fixed support 40 or vice versa, or alternatively both may be movable in closure. The actuating means, in the form of a bell-shaped movable support called the "movable bell 6" in the remainder of the description, is mounted on the core 7. The core 7 is guided in translation with respect to the movable bell 6 by means of several guide tubes 70, 71 associated with return means (not shown) such that, in the open position of the device, the core 7 is pressed substantially against the end wall of the movable bell.

The core 7 further comprises peripheral sealing means 74, such as an elastomer seal arranged to bear in closure against the peripheral edges 41 of the capsule support 40. The core 7 is thus the part that presses closest to the capsule entry surface at the time of closure, thus allowing the central piercing and injection element 5 to be introduced through the capsule, more precisely through the capsule entry membrane 35. An additional sealing element 75 may also surround the piercing and injection element to prevent fluid from rising back up through the injection system and outside of the device.

In the example shown, the means for actuating the piercing and injection element or movable bell is integral with the element 5 and modifies, depending on its relative position with respect to the capsule support, the position of the piercing and injection element inside the capsule, thus changing the configuration for wetting the substance contained in the closed chamber of the capsule. More precisely, the movable bell 6 has detection means as a function of the type of capsule, which are formed by engagement edges 60 that can engage with complementary edges 360 of the capsule and therefore are able to push the bell 6 away from the head base 7 in the direction A depending on the width of the edges of the capsule (as shown in FIG. 2). The position for introducing the piercing and injection element can therefore assume two different positions, depending on whether the capsule has wide edges or edge extensions that engage against the edges of the bell 6 or a configuration with narrow edges, such that the edges of the bell do not meet complementary edges of the capsule. In FIG. 1, the device is in a configuration in which the capsule has wide edges or extensions 36 to push back the bell 6 and thus stop the piercing and injection element 5 in a position of introduction close to the entry of the capsule 3. Such a position makes it possible to inject the fluid substantially at the entry to the bed of substance, which is very suitable for ground products to be extracted, for example.

FIG. 2 shows a configuration in which the capsule has narrower edges that allow the bell 6 to pass along the capsule support when the device is closed, without pushing it back. In this case, the piercing and injection element 5 is allowed to reach a deeper position inside the capsule 3. Such a position is advantageous for wetting the substance via its base, thus gradually breaking up the mass of substance. For soluble substances, for example, such a wetting method is particularly efficient.

Figure 3:
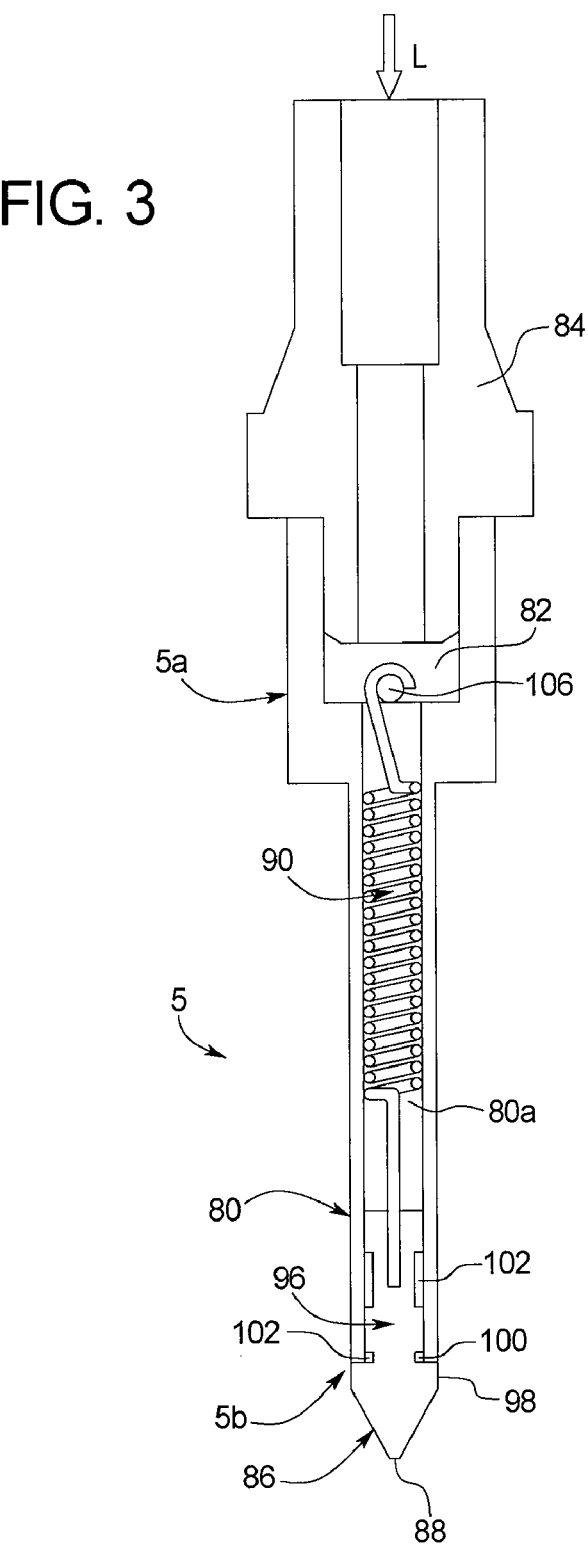
FIG. 3 is a sectional view of the piercing and injection element of the device according to the invention.

FIGS. 3 to 5 show, in detail, a preferred embodiment of the piercing and injection element 5 with which the device of the invention is equipped. It can be seen in particular in FIG. 3 that the piercing and injection element 5 comprises a tubular body 80 defining a central passage or channel 80a for receiving a liquid under pressure symbolized by the arrow L coming from a liquid supply, typically a hot water supply for a device (not shown).

The proximal end 5a comprises an orifice 82 opening into the channel 80a and in which is force-fitted, in a leaktight manner, a nozzle 84 for connecting to the water supply of the device.

The distal end 5b of the element 5 is arranged in the form of a valve comprising a movable closure means 86 designed to close off the distal part of the channel 80a, in a first position called the rest position (FIGS. 3 and 4) and, in a second position called the work position, to open under the effect of the pressure from the liquid L against an elastic element 90 so as to free a distal orifice or passage 92 (FIG. 5) and create a layer of liquid 94 sprayed through the passage 92.

The closure means 86 has an end part 86 of generally conical shape ending in a point and a rear guide part 96 sliding in the channel 80a of the tubular body 80. The function of the pointed portion 88 of the closure means 86 is to pierce the entry membrane 35 of the capsule 3 when the device is used, while the function of the rear part 96 is to guide the movement of the closure means in the tubular body 80.

It can also be seen in FIGS. 3 to 5 that the pointed portion of the closure means 86 has an external peripheral surface 98 lying in the extension of the external peripheral surface of the tubular body 80. This configuration makes it easier to extract the piercing element 5 from the capsule 3 and to prevent the closure means 86 from catching on the film 35 during this extraction.

The closure means 86 further comprises, behind its pointed end, a shoulder surface 100 that may bear against an annular surface 104 of complementary shape made at the distal end of the tubular body 80 when the closure means is in its rest position.

The rear guide part 96 of the closure means comprises openings 102, so that the liquid can flow from the proximal orifice to the shoulder surface 100 and into the capsule through the passage 92 when the closure means 86 is in its work position.

The closure means 86 is moreover associated with the elastic element 90 lying in the channel 80a that returns the closure means 86 to its rest position, in which the shoulder surface 100 bears against the annular surface 104 to eliminate the passage 92 and seal the channel 80a closed. According to a variant that has not been shown, a seal may be inserted between the shoulder surface 100 and the annular surface 104. The elastic member 90 preferably comprises a helical spring a first straight end of which, extending along the longitudinal axis of the channel 80a, is fastened to the rear guide part 96, for example by being driven into it, and a second end of which is fastened inside the tubular body. In the example shown, the second end is hook-shaped and is hooked over a pin 106 that is driven transversely into the tubular body at the orifice 82.

In the example shown, the piercing and injection element 5 is placed substantially at the centre of the housing receiving the capsule 3 and the openings 102 made in the rear guide part 96 are arranged so as to produce a multidirectional divergent spray in the form of a layer of liquid 94 extending continuously around the periphery of the pointed part of the element 5. This configuration makes it possible to spray the substance contained in the capsule 3 in a homogeneous circular manner.

Since the size of the opening of the passage 92 depends on both the pressure at which the liquid L is injected into the element 5 and the return force of the elastic element 90, these two parameters may be adjusted to obtain a liquid layer having a desired thickness. Preferably, these parameters will be adjusted to obtain a liquid layer 94 of less than 0.5 mm, typically 0.3 mm.

As a variant, the openings 102 in the rear guide part 96 may also be configured so as to create a liquid layer of different shape, for example in the shape of a circular sector, particularly in the case where the piercing and injection element 5 is no longer placed at the centre of the housing receiving the capsule 3, but at the periphery of the said housing.

FIGS. 6a and 6b show a variant embodiment of the piercing and injection element, designated by the reference 110, that can be used in a device according to the invention. As can be seen in these figures, the piercing and injection element 110 comprises injection means 112 that produce a divergent jet in the form of a thin layer of liquid. These means 112 comprise, in the example shown, two fixed slots 112a and 112b that extend transversely to the longitudinal direction of the element 110 and communicate with the liquid intake channel 114. The term "fixed slot" means a slot whose size and shape do not vary over time. The two slots each cover a complementary angular sector so that together they cover a sector of 360 degrees. The piercing and injection element 110 thus produces a divergent jet extending over a circular sector that is sufficiently wide to wet substantially all of the substance in the upper part of the capsule, particularly when it is placed at the centre of the capsule. For reasons connected with the manufacture of the element 110, it will be noted that the slots 112a and 112b are offset heightwise from one another. It goes without saying that the number and shape of the slots are not limited to the example described and that the person skilled in the art may envisage a different number and shape of slots as long as they produce a jet covering the desired angular sector.

It will be noted that the slots 112a and 112b are each arranged so that the thin layer of liquid is produced substantially continuously over an angular sector of 360 degrees. Moreover, these slots are arranged to produce a layer of liquid whose thickness is less than or equal to 0.5 mm and preferably less than 0.3 mm. For this purpose, each slot will be preferably around 0.5 mm high.

According to an advantageous embodiment (not shown) of this variant embodiment, the axis of the slots 112a and 112b defining the direction of the jet of liquid makes an angle of between 0° and 25° with the horizontal, and preferably an angle of around 15°. The liquid injected by these orifices is thus directed upwards and is first reflected off the underside of the film 35 and then directed down towards the bed of substance in a much more dispersed state. In this way, the substance is wet even more homogeneously.

Naturally, it is also possible to envisage placing the piercing and injection element 110 in an off-centred position within the capsule, more precisely near the side wall of the latter. In this case, one or more slots will be directed towards the centre of the capsule to produce a plurality of divergent jets that overlap to form a thin layer of liquid that sprays and wets the substance contained in the upper part of the capsule over an angular sector of between 120 and 360°, preferably around 180°.

It is also possible to envisage creating the thin layer of liquid by means of a plurality of separate, discrete orifices distributed in sufficient numbers over an angular sector through the piercing and injection element. The orifices will then have to be close enough together not to create zones of air but, on the contrary, to form a relatively continuous layer of liquid.

The invention is of course not limited to the embodiment described above and it will be understood that various modifications and/or improvements that are obvious to those skilled in the art may be made to it while remaining within the scope of the invention defined by the attached claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A device for preparing a beverage from a food substance contained in a capsule, the device comprising a housing for receiving the capsule, at least one piercing and injection element having a channel for receiving a liquid under pressure, the piercing and injection element being so constructed and arranged to project into the housing and pierce a face of the capsule in at least one position of operation of the device so as to allow a liquid to be introduced into the capsule from the channel, the piercing and injection element having a distal end arranged in the form of a valve having a closure means with an end, the valve being designed to close off the channel in a first position and to open under the effect of the pressure from the liquid against an elastic element so as to free a passage as a function of the pressure and thus create a layer of liquid sprayed through the passage in a second position, wherein the piercing and injection element comprises a tubular body defining the channel, the tubular body comprises a proximal orifice for connection to a liquid intake and a distal orifice defining the passage with a pointed part, the distal orifice and the proximal orifice being linked by the channel, and in the closure means has a rear guide part that slides in the tubular body, and wherein the pointed end comprises an external peripheral surface lying in the extension of the external peripheral surface of the tubular body, and wherein the closure means comprises, behind a pointed end, a shoulder surface and the rear guide part comprises openings allowing a liquid to flow from the proximal orifice to the shoulder surface and through the passage in the second position.

2. The device according to claim 1, wherein the shoulder surface of the closure means is held against an annular surface of the tubular body by the elastic element in the absence of pressure from the liquid, the channel then being sealed closed.

3. The device according to claim 1, wherein the elastic element comprises a helical spring lying in the channel and in that the spring is fastened to the rear guide part of the closure means by a first end and to a hook element integral with the tubular body by a second end.

4. A device for preparing a beverage from a food substance contained in a capsule, the device comprising a housing for receiving the capsule, at least one piercing and injection element having a channel for receiving a liquid under pressure, the piercing and injection element being so constructed and arranged to project into the housing and pierce a face of the capsule in at least one position of operation of the device so as to allow a liquid to be introduced into the capsule from the channel, the piercing and injection element having a distal end arranged in the form of a valve having a closure means with an end, the valve being designed to close off the channel in a first position and to open under the effect of the pressure from the liquid against an elastic element so as to free a passage as a function of the pressure and thus create a layer of liquid sprayed through the passage in a second position, wherein the piercing and injection element comprises a tubular body defining the channel, the tubular body comprises a proximal orifice for connection to a liquid intake and a distal orifice defining the passage with a pointed part, the distal orifice and the proximal orifice being linked by the channel, and in the closure means has a rear guide part that slides in the tubular body.

5. A device for preparing a beverage from a food substance contained in a capsule, the device comprising a housing for receiving the capsule, at least one piercing and injection element having a channel for receiving a liquid under pressure, the piercing and injection element being designed to project into the housing and pierce a face of the capsule in at least one position of operation of the device so as to allow a liquid to be introduced into the capsule from the channel, the piercing and injection element has at least one slot that is transverse to the piercing and injection element, the slot being arranged so as to inject the liquid into the capsule in the form of at least one thin layer extending in a continuous, divergent and multidirectional manner, covering a spray surface in an arc of a circle inside the capsule, wherein the slot extends over an angular sector of between 30 and 180 degrees and wherein the piercing and injection element also comprises a second transverse slot that is located at a different level to the first slot along the piercing and injection element.

6. The device according to claim 5, wherein the second slot covers an angular sector that is complementary to that of the first slot so that together they cover a sector of 360 degrees.

\* \* \* \* \*